United States Patent [19]

Hetsugi

[11] 4,419,661
[45] Dec. 6, 1983

[54] DUAL CATHODE-RAY TUBE DISPLAY SYSTEM FOR TEXT EDITING

[75] Inventor: Seiji Hetsugi, Kawasaki, Japan

[73] Assignee: New Nippon Electric Co., Ltd., Kanagawa, Japan

[21] Appl. No.: 165,826

[22] Filed: Jul. 3, 1980

[30] Foreign Application Priority Data

Jul. 4, 1979 [JP] Japan ................................ 54-84818
Jul. 4, 1979 [JP] Japan ................................ 54-84819
Jul. 4, 1979 [JP] Japan ................................ 54-84820
Jul. 4, 1979 [JP] Japan ................................ 54-84821

[51] Int. Cl.³ .......................................... G09G 1/16
[52] U.S. Cl. .................................. 340/707; 340/717; 340/751; 340/731
[58] Field of Search ............... 340/707, 708, 709, 710, 340/731, 717, 751, 794, 795

[56] References Cited

U.S. PATENT DOCUMENTS

| | | | |
|---|---|---|---|
| 3,189,889 | 6/1965 | Bridgett | 340/707 |
| 4,022,969 | 5/1977 | McKinlay | 340/710 |
| 4,091,374 | 5/1978 | Müller et al. | 340/717 |
| 4,303,916 | 12/1981 | Hakaridani et al. | 340/707 |

Primary Examiner—Marshall M. Curtis
Attorney, Agent, or Firm—Sughrue, Mion, Zinn, Macpeak & Seas

[57] ABSTRACT

A cathode-ray tube display device including first and second cathode-ray tube displays. The first cathode-ray tube displays an entire screen full of characters and symbols or the like in dot matrix form. One of the characters from the first cathode-ray tube can be transferred and displayed upon the second cathode-ray tube with the use of a light pen applied to the screen of the first cathode-ray tube display. The selected character can then be edited or corrected on the second cathode-ray tube display and then transferred back to the first cathode-ray tube display.

14 Claims, 4 Drawing Figures

DUAL CATHODE-RAY TUBE DISPLAY SYSTEM FOR TEXT EDITING

BACKGROUND OF THE INVENTION

The present invention relates generally to cathode-ray tube display devices. More particularly, the invention relates to a cathode-ray tube display device in which display data can be written at any desired position on the display screen of the device and in which characters, figures or the like displayed on the screen can be edited. Yet more specifically, the invention relates to a cathode-ray tube display device in which scanning lines are divided into a number of picture elements, the brightness of each picture element is controlled, and the image of character, figures or the like is formed and displayed on the screen utilizing a plurality of picture element matrices arranged in vertical and horizontal directions.

In general, in a display device of this type, data stored in a refresh or pattern memory at addresses corresponding respectively to picture elements on the screen of a cathode-ray tube is read out from the memory in synchronization with the raster scanning of the cathode-ray tube thereby to display the entire frame of data stored in the memory. Data displayed on the screen is written into or erased from the memory by an input keyboard or with an optical detector called "a light pen" which can be manipulated directy on the screen.

The invention provides a cathode-ray tube display device in which data corresponding to each minute picture element can be written or erased with a light pen.

Heretofore, in writing data on the screen or in erasing data from the memory and hence screen using a light pen, raster light is detected by the light pen and, in accordance with the detection output of the light pen, the count value of an address counter refreshing the data on the screen is latched to determine the position of the light pen on the screen. The count value of the address counter corresponds to the picture element on the screen. If it is desired that the data on the screen be capable of being written or erased with the light pen with a resolution of a single picture element, the size of the raster light within the detection range of the light pen must be sufficiently small that the position indicated by the light pen can be correspondingly accurately determined.

Furthermore, in order to determine the position of the light pen with high accuracy, it is necessary that the detection output of the light pen be maintained stable. For this purpose, it is required that the detection range of the light pen be relatively wide. Thus, the detection range of the light pen is generally made wide enough to cover several elements. Should the size of the picture elements be further reduced in order to increase the amount of data which can be displayed on the screen while the number of picture elements detected by the light pen is increased to stabilize the detection output, if the light pen is even slightly shifted, then the above-described count value will change.

As is clear from the above description, the previously used technique of writing and erasing data for every picture element is disadvantageous in that the detected position of the light pen is liable to shift. As the density of picture elements on the screen is increased and the size of the picture elements correspondingly decreased, the light pen must be operated or moved more accurately. However, in practice, an operator cannot hold the light pen sufficiently stable to maintain the desired accuracy requirements. Accordingly, as the size of picture elements is decreased in order to increase the amount of data displayed on the screen, difficulties in writing and erasing data with a resolution of a single picture element increase.

Figure 1:
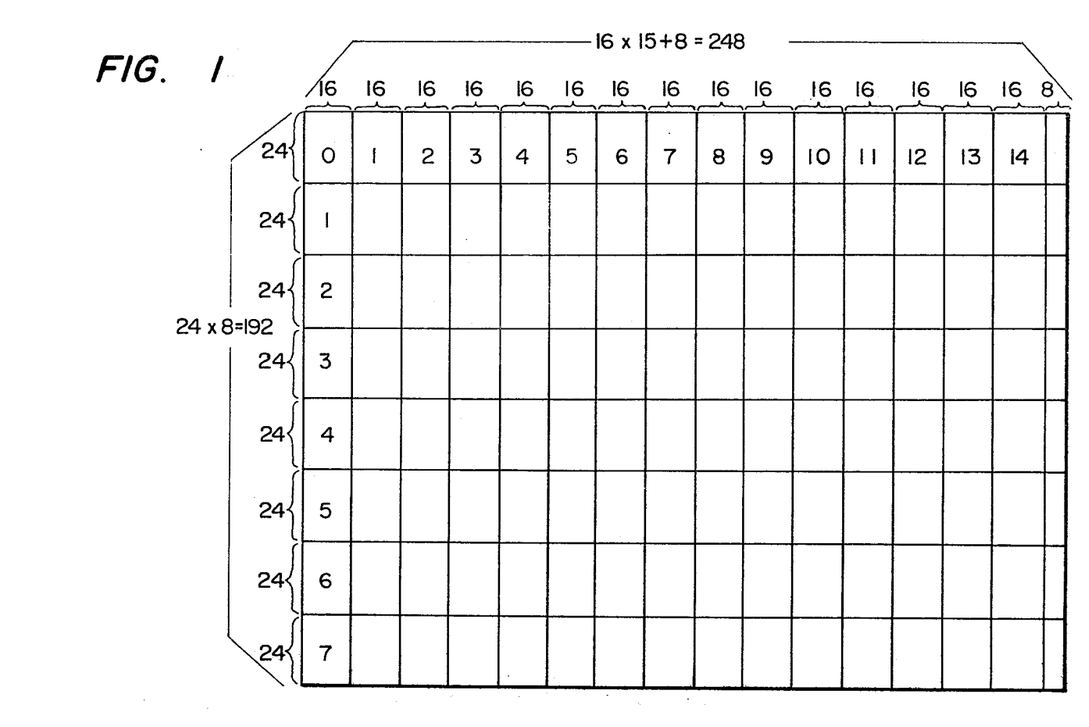
FIG. 1 is an explanatory view showing the arrangement of character dot matrices utilized upon one of the cathode-ray tube display screens in accordance with the invention.

As an example, with reference to FIG. 1, where the data to be displayed on the screen is composed of 15 characters in each of 8 lines which are displayed by 248 dots (picture elements) arranged horizontally in each of 192 lines, each character is displayed in a dot matrix composed of 24 lines each having 16 horizontally arranged dots. When it is required to write a complicated character such as a Chinese character having thin lines in one of the blocks, the detected position of the light pen may have a high likelihood of being shifted depending on the angle at which the light pen is held. That is, it is rather difficult to write character data accurately.

SUMMARY OF THE INVENTION

In view of the foregoing, in accordance with the invention there is provided a cathode-ray tube display device which includes a second cathode-ray tube of relatively small size which displays the picture elements for a single designated character at an enlarged scale such that the picture elements of the designated character occupy the entire screen of the second cathode-ray tube so that, after data has been written onto or erased from the screen of the second cathode-ray tube such as for correcting the lines of the character, the data is transferred to a chosen display position on the screen of a first cathode-ray tube whereby the data displayed on the screen of the first cathode-ray tube can be suitably edited.

Accordingly, a first object of the invention is to provide a cathode-ray tube display device in which, with the size of picture elements properly correlated with the detection range of a light pen, writing and erasing of data can be effected accurately for each picture element.

A second object of the invention is to provide a cathode-ray tube display device in which data is directly written on and erased from the screen of a first cathode-ray tube on which the overall data pattern is displayed. Among the data thus displayed the data of a plurality of regular picture element blocks such as data for a single character is transferred to the screen of a second cathode-ray tube where it is displayed at an enlarged scale. After the image thus transferred has been corrected or added to on the screen of the second cathode-ray tube, the image thus treated is transferred back to the proper display region of the picture element block on the screen of the first cathode-ray tube.

In accordance with these and other objects of the invention, there is provided a cathode-ray tube display device in which scanning lines are divided into a number of picture elements the brightness of which is controlled and an image of characters, figures or the like is displayed on the screen of the cathode-ray tube display device in a plurality of picture element matrices extending vertically and horizontally. First and second cathode-ray tubes are provided along with means for scanning each. A first memory means including a first memory is provided having addresses which correspond to the addresses of picture elements on the screen of the first cathode-ray tube with the first memory storing the entire complement of data which is still to be displayed on the screen of the first cathode-ray tube. The first memory means reads the first memory in synchronization with the raster scanning of the first cathode-ray tube so as to display the data stored in the first memory on the display screen surface of the first cathode-ray tube. A second memory means is provided including a second memory having addresses which correspond to the addresses of picture elements in a block obtained by dividing the picture elements on the screen of the first cathode-ray tube into a plurality of blocks each of which includes a predetermined number of picture elements. The second memory means reads the second memory in synchronization with the raster scanning of the first cathode-ray tube wherein data for a single block stored in the second memory is displayed upon essentially the entire screen or display surface of the second cathode-ray tube. A first position discriminating means includes a light pen having a tip adapted to be applied to the screen of either the first or second cathode-ray tube to detect raster light and for correspondingly outputting position data representative of the position of the tip of the light pen on the screen of one of the first and second cathode-ray tubes. A second position discriminating means discriminates among the plurality of blocks by dividing all of the picture elements on the screen of the first cathode-ray tube in one block to which the position data outputted by the first position discriminating means belongs to output in response thereto block position data. Transferring means transfers the entire picture element data corresponding to a single designated block between the first and second memory means.

DESCRIPTION OF THE PREFERRED EMBODIMENTS

Figure 2:
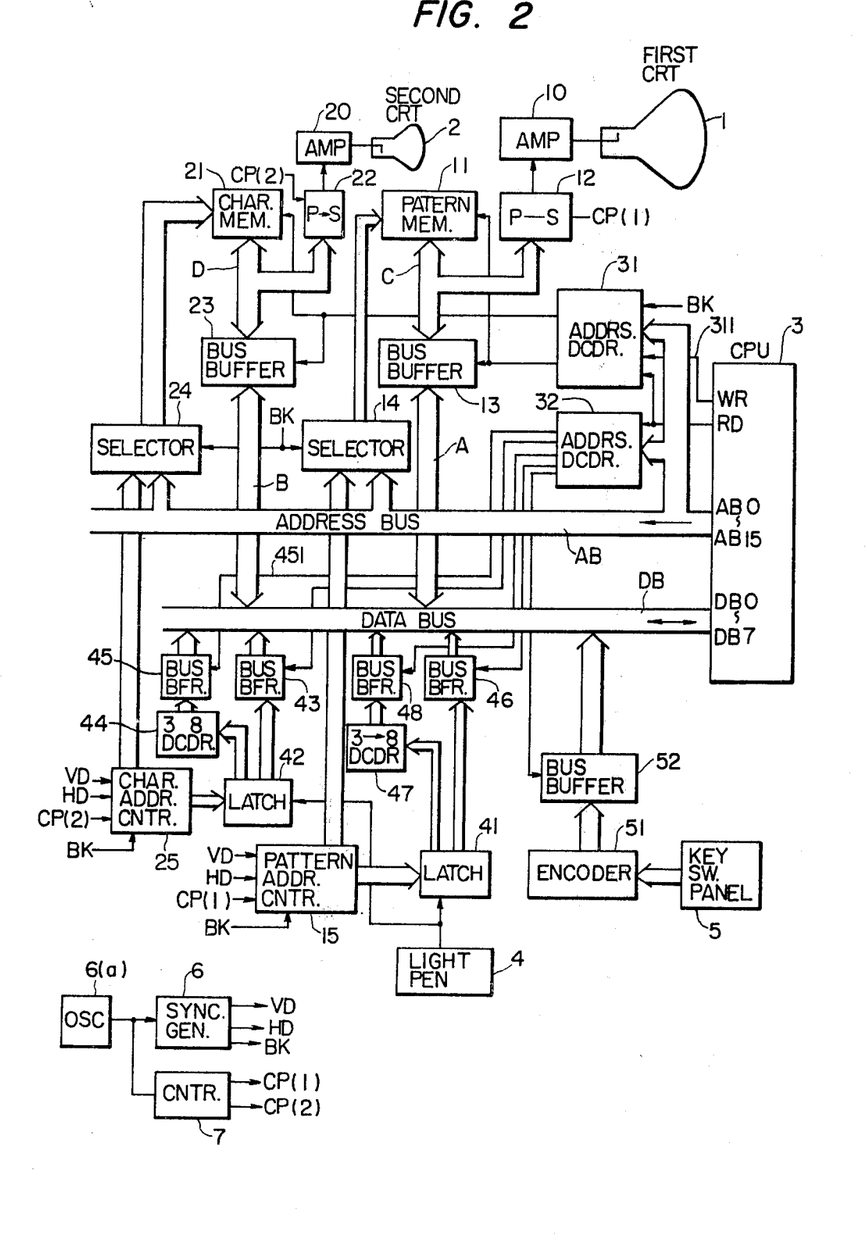
FIG. 2 is a schematic block diagram of a preferred embodiment of a display system of the invention.
Figure 4:
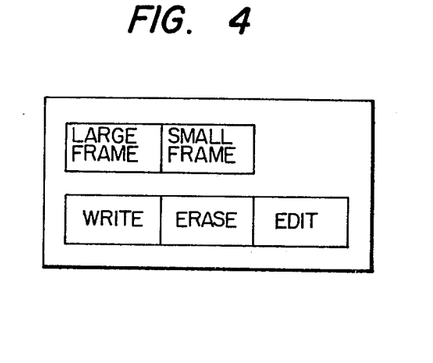
FIG. 4 is a front view of a key switch panel used in the system of FIG. 2.

The invention will be described with reference to the preferred embodiment shown in FIG. 2 which is a block diagram showing an example of a cathode-ray tube display device constructed in accordance with the invention. In FIG. 2, reference numeral 1 designates a first cathode-ray tube, 2 a second cathode-ray tube, 3 a central processing unit hereinafter referred to merely as "a CPU 3" when applicable, 4 a light pen, and 5 a key switch for applying a plurality of key inputs as shown in FIG. 4 to the device. A first cathode-ray tube display section is constituted by the first cathode-ray tube 1, a pattern memory 11 in which all data to be displayed on the cathode-ray tube 1 is stored, a parallel-serial data converter 12, a first bus buffer 13, and a first selector 14. A second cathode-ray tube display section is made up of the second cathode-ray tube 2, a character memory 21 in which all data to be displayed on the second cathode-ray tube 2 is stored, a parallel-serial data converter 22, a second bus buffer 23, and a second selector 24.

In the pattern memory 11, the addresses of the various data points correspond to the designated picture elements on the screen of the first cathode-ray tube. The data from the pattern memory 11 is read out in synchronization with the raster scanning of the first cathode-ray tube 1 so that the data stored in the pattern memory 11 is displayed on the first cathode-ray tube 1 in a refresh mode. Data is written into or read out of the various addresses in the pattern memory 11 through the bus buffer 13 and address data is supplied from the first selector 14.

The addresses in the character memory 21 correspond one for one with each of the designated picture elements on the screen of the second cathode-ray tube 2. The data from the character memory 21 is read out in synchronization with the raster scanning of the second cathode-ray tube 2 so that the data stored in the character memory 21 is displayed on the second cathode-ray tube 2 in a refresh mode. The raster scanning of the second cathode-ray tube 2 is in synchronization with the raster scanning of the first cathode-ray tube 1. Data is written into or read out of the character memory 21 through the bus buffer 23 and address data is supplied from the second selector 24.

Figure 3:
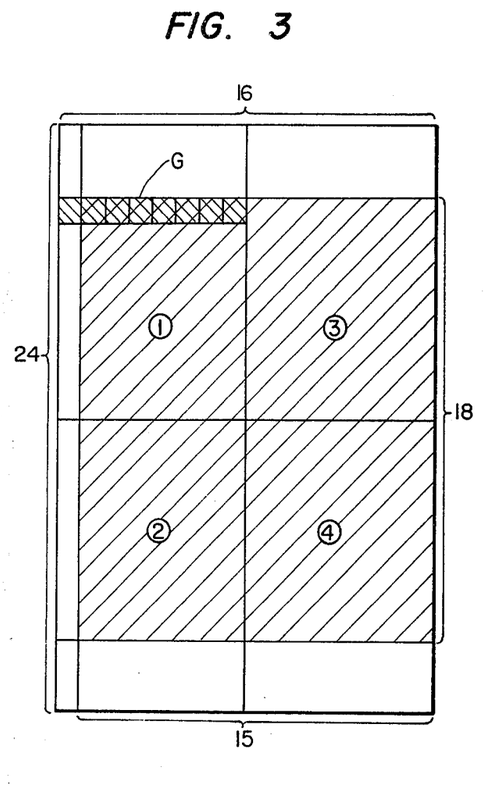
FIG. 3 is an explanatory diagram showing the arrangement of picture elements displayed on the screen of a second cathode-ray tube.

The invention will be described with reference to the case where all the data to be displayed on the first cathode-ray tube 1 is as shown in FIG. 1 in which each picture element is formed by a 16×24 dot matrix. Correspondingly for this case, the picture elements displayed on the second cathode-ray tube 2 are in the form of a 16×24 dot matrix as shown in FIG. 3. Furthermore, in this case, a pattern such as for instance a pattern of characters to be displayed as a single block occupies the hatched region in FIG. 3. Six lines made up for example of the upper three lines of one pattern and the lower three lines and the first dot of a lower adjacent pattern are employed as blanks to form margins to separate the patterns in adjacent blocks from one another.

Referring back to FIG. 2, reference numeral 6 designates a synchronizing signal generator which produces a vertical synchronizing signal herein designated VD, a horizontal synchronizing signal herein designated HD and a blanking signal BK for the first and second cathode-ray tubes 1 and 2 with the aid of a clock pulse signal outputted by an oscillator 6A. Further in FIG. 2, reference numeral 7 designates a counter which, with the aid of the clock pulse signal, forms a dot clock pulse signal CP(1) having a pulse interval corresponding to the scan period of a picture element displayed on the first cathode-ray tube 1 and a dot clock pulse signal CP(2) having a pulse interval corresponding to the scan period of a picture element displayed on the second cathode-ray tube 2.

A pattern address counter 15 receives the above-described VD, HD, dot clock pulse CP(1) and blanking pulse BK. The pattern address counter 15 counts the HD pulses and is reset by the VD signal to supply to the first selector 14 and a first latch circuit 41 memory Y(1) address data representative of the addresses in the pattern memory 11 which correspond to the positions of picture elements in the vertical or y direction on the screen of the first cathode-ray tube 1. Simultaneously, the pattern address counter 15 counts the dot clock pulse CP(1) signal, which may operate at 5.73 MHz for instance, and is reset by the HD signal to supply to the first selector 14 and the first latch circuit 41 memory X(1) address data representative of the addresses in the pattern memory 11 which corresponds to the positions of picture elements in the horizontal or X direction on the screen of the first cathode-ray tube 1.

The operation of a character address counter 25 is similar to that of the above-described pattern address counter 15 except that the dot clock pulse CP(2) is applied thereto. That is, similar to the pattern address counter 15, the character address counter 25 supplies to the second selector 24 and a second latch circuit 42 memory Y(2) address data representative of the addresses in the character memory 21 which correspond to the positions of picture elements in the Y direction of the second cathode-ray tube 2 and simultaneously supplies memory X(2) address data to the second selector 24 and the second latch circuit 42.

An address bus AB from the CPU 3, which will be described in detail below, is connected to the other inputs of the first selector 14 and second selector 24. Each of the selectors 14 and 24 is a switching circuit which passes one of the two inputs in response to an input control signal. Specifically, for the screen refresh display period, during which time no blanking is effected, the first selector 14 selects the memory X(1) and Y(1) address data from the pattern address counter 15 and applies the data thus selected to the pattern memory 11. Similarly, for the same period, the second selector 24 selects the memory X(2) and Y(2) address data from the character address counter 25 and supplies the data thus selected to the character memory 21. In this case, the data from the first bus buffer 13 and the second bus buffer 23 are not selected and buses A and B extending from the data bus DB are maintained at a high impedance level.

Thus, for the display period, the memory X(1) and Y(1) address data from the pattern address counter 15 is applied to the pattern memory 11 through the first selector 14 and therefore the data, 8 bits in the present case, at the addresses corresponding to the address data is supplied to a data bus C. Similarly, the memory X(2) and Y(2) address data from the character address counter 25 is supplied to the character memory 21 via the second selector 24 and the data, again 8 bits, at the addresses corresponding to the address data is supplied to a data bus D.

The data applied to the data buses C and D is loaded into shift registers forming the parallel-serial converters 12 and 22, respectively, in a known manner. The data thus loaded is read out by picture element with the aid of the dot clock pulse signals CP(1) and CP(2), respectively. As a result, the data thus read out is screen display data representative of a series of picture elements. The display data is applied through conventional output circuits 10 and 20 which drive the cathodes of the first and second cathode-ray tubes 1 and 2 to display the data as bright points of the screens thereof.

The various sections of the circuit thus constructed are reset to the initial conditions when the power switch is turned on and are then controlled by the key inputs provided by the key switches 5 of the key switch panel shown in FIG. 4 and the light pen 4. To carry this out, the CPU is programmed to respond to the key switch inputs.

With respect to the key switch panel 5 shown in FIG. 4, a group of switches composed of a "large frame key switch" and a "small frame key switch" and a group of switches composed of a "write key switch", an "erase key switch" and an "edit key switch" are operable independently of each other. One of the switches in each group may be selectively operated. When one of the large and small frame key switches is operated, the other is released. Similarly, when one of the write, erase and edit key switches is operated, the remaining switches are released. When a switch is depressed, it instructs the device to operate in the corresponding mode. Operation of the key switch panel 5 in FIG. 2 instructs the CPU 3 to process the contents in a determined manner. When one of the key switches is depressed, then a key switch input flag is set. As the CPU is programmed to search for such flags, the binary coded data for the corresponding switch, which is encoded by an encoder 51, is inputted to the CPU 3 through an eighth bus buffer 52 and the data bus DB. According to the data thus inputted, the CPU 3 discriminates which key switch input has been applied and performs the corresponding operation.

The key switch inputs applied to the CPU 3 operate and are combined as follows.

To write data onto the screen of the first cathode-ray tube 1 directly with the light pen 4, first the large frame key switch in FIG. 4 is depressed after which the write key switch is depressed. Upon this control operation, the light pen 4 may be used on the screen of the first cathode-ray tube 1 as a result of which data is written for the corresponding picture elements.

To write data onto the screen of the second cathode-ray tube 2, the small frame key switch, rather than the large frame key switch, is depressed. The remaining operations are the same as for above-described case as the state of the write key switch is maintained unchanged.

To erase the data displayed on the first or second cathode-ray tube 1 or 2, first the cathode-ray tube from which the data should be erased is designated by selectively operating the large and small frame key switches after which the erase key switch, rather than the write key switch, is depressed.

To transfer data from the second cathode-ray tube 2 to the first cathode-ray tube 1, first the small frame key switch is depressed and then the edit key switch. Thereafter, the light pen 4 is moved to a desired block on the screen of the first cathode-ray tube 1 as a result of which the image on the second cathode-ray tube 2 is transferred to the block which has been designated by the light pen 4.

On the other hand, to transfer the image of a block from the screen of the first cathode-ray tube 1 to the second cathode-ray tube 2, first the large frame key switch is depressed and then the edit key switch. The light pen 4 is next moved to a desired block on the screen of the first cathode-ray tube 1. It should be noted that it is unnecessary to again depress the edit key switch as it has already been depressed as described above.

In accordance with the key inputs provided by the above-described operations, the CPU 3 controls the various sections and processes data applied thereto through the data bus DB and the address bus AB. Since the operations of the various sections are substantially the same as those used for writing data into the character memory 21, only the operation of writing data into the character memory 21 need be described in full detail.

When the light pen 4 is moved to the screen of the cathode-ray tube, the light pen detects the raster light as it is produced upon the scanning of the screen and provides a pulse output when the scanning beam passes the light pen's position as is well known in the art. As described previously, the character address counter 25 applies the memory X(2) and Y(2) address data to the first latch circuit 42. The latch circuit 42 latches the address data which is supplied upon reception of the detection output from the light pen 4. As the memory X(2) and Y(2) address data indicates the horizontal and vertical positions of a picture element on the screen the data latched by the second latch circuit 42 indicates the position of the light pen 4 on the screen. The data latched by the second latch circuit 42 is used to apply character memory address data specifying the corresponding storing address in the character memory to a fifth bus buffer 43 and to apply write data to the character memory 21 through a bus buffer 45 and a 3-8 detector 44.

The memory address data and the write data are arranged as follows. The character memory address data, as indicated by the hatched region G in FIG. 3, corresponds to positions on the screen which are obtained successively in the order of ①—②—③—④ as indicated in this figure with eight dots out of the total sixteen dots in a character in the X direction as one unit. More specifically, the character memory address data is made up of one bit which indicates the left or right half of the screen by a "0" and "1", respectively, and five bits indicating one of the 24 lines.

All that is necessary from the data to be written into the character memory 21 is that the data be capable of identifying a position in eight dots obtained by dividing sixteen dots into two parts because the character memory address data circulates with the eight dots as a unit. Thus, the data supplied to the character memory 21 from the fourth bus buffer 45 is eight bits only one of which is a "1". Accordingly, in the above-described memory X(2) and Y(2) address data, the lower three bits of the X address data is converted into 8-bit data corresponding to eight dots on the screen by the 3-8 decoder 44 with the resulting 8-bit data supplied to the fourth bus buffer 45.

The fourth bus buffer 45 and the fifth bus buffer 43 are opened by instructions from the CPU 3 to apply the above-described write data and character memory address data to the data bus DB. The instruction from the CPU 3 is in the form of 16-bit parallel address data which is applied to the address bus AB. For instance, if it is assumed that address data for selecting the fifth bus buffer 43 is applied to the address bus AB, then the address data is decoded by an address decoder 32 as a result of which the bus buffer 43 is opened through a line 431. The opening of the fifth bus buffer 43 occurs with the reading out of memory read control signal of the CPU 3. The CPU 3 receives the memory address data which was applied to the data bus DB through the opened fifth bus buffer 43 and stores it in a predetermined register incorporated therein. In a similar fashion, the fourth bus buffer 45 is opened so that the CPU 3 receives the write data applied to the data bus DB and stores it in a predetermined register incorporated therein. The above-described operations of the CPU 3 are carried out sequentially in a short period of time.

In accordance with the memory address data thus received, the CPU 3 outputs to the address bus AB the memory address data representing the corresponding address in the character memory 21. The data thus outputted is supplied to the character memory 21 through the second selector 24. In this operation, the CPU 3 supplies a memory write control signal for controlling writing of data into the character memory 21 on a line 311 to the read/write terminal of the character memory 21 to place the memory in write state. At the same time, the second bus buffer 23 is opened and the write data stored in the CPU 3 is applied to the character memory 21 through the data buses DB and B.

The writing of data into the character memory 21 is achieved as described above. The writing or reading instruction to the memory is issued from the CPU 3. The instruction from the CPU 3 is implemented such that the refresh data and the write data applied from the outside source do not interfere with each other on the data bus DB. That is, the writing instruction is issued during the blanking period. Taking this into consideration, the writing/reading operation of the character memory 21 is carried out repeatedly, 48 (24 lines×2) times in the preferred embodiments. For a color display device using a color cathode-ray tube having three primary colors, the writing/reading operation should be repeated 24×2×3 times.

The writing operation of the character memory 21 is as described above. The writing operation of the pattern memory 11 is substantially the same as that of the character memory 21. In this case, it is of course necessary to apply the light pen 5 to the screen of the first cathode-ray tube 1. In addition, the operations of the first latch circuit 41, seventh bus buffer 46, 3-8 decoder 47, sixth bus buffer 48 and CPU 3 are substantially the same as in the case of the character memory 21 and accordingly need not be described.

Next, the operations of the display device which are carried out where data from the screen of the second cathode-ray tube 2 is transferred to the screen of the first cathode-ray tube 1 will be described. In this case, the key inputs provided by operating the small frame key switch and the edit key switch as described above are applied to the CPU 3. In response to the reception of the key inputs provided by operating the small frame key switch and the edit key switch, the CPU in accordance with its pre-stored program, with the aid of the detection output of the light pen 5 causes the memory X(1) and Y(1) address data of the pattern address counter 15 to be latched by the first latch circuit 41 so that the address data and the writing data of the pattern memory 11 from the sixth bus buffer 48 and the seventh bus buffer 46 can be received in the same manner as described above. The pattern memory address data, which is regularly divided separately according to blocks, has previously been applied to the CPU 3. Thus, upon reception of the "edit" key switch input, the CPU 3 makes a calculation to determine to what block the memory address data received from the seventh bus buffer 46 belongs according to a predetermined routine and applies the calculation result as the block address data to the address bus AB. As a result, the pattern memory 11 is addressed for the block of the corresponding address. In this case, one block, as shown in FIG. 1, corresponds to one character of 24 lines and 16 dots.

Thus, when the "edit" key input is received at the CPU 3 and the light pen 5 is applied to the screen of the first cathode-ray tube 1, the single bit pattern memory address data indicative of the block position is applied from the seventh bus buffer 46 to the CPU 3 where it is stored. Then, the CPU 3 successively transfers the data stored in the character memory 21 to the storing address in the pattern memory 11 which corresponds to the block to which the position designated by the light pen belongs. In this operation, the data in the character memory 21 is applied through the data buses D, B, DB, A and C to the pattern memory 11 in the stated order and is written therein.

The operations of the various circuit sections which control the transfer of data and the flow of address data as described above are effected by instructions which are issued from the CPU 3 upon the address bus AB. The sequence of operations is controlled by a routine which has been pre-programmed.

The case where the image from the second cathode-ray tube 2 is transferred to the first cathode-ray tube has been described. For the opposite case, the operations of the various circuit sections are similar to those in the above-described case. More specifically, for the opposite case, the "large frame" key switch input is employed instead of the "small frame" key switch input and, similar to the above-described case, the light pen 5 is applied to the block of data which is to be transferred to the first cathode-ray tube 1.

The operation of the key switches can be changed if desired by changing the programmed routine for the CPU 3. Accordingly, within the scope of the present invention, the display device may be so modified that, instead of having to operate both the "large frame" key switch and the "small frame" key switch, a single key switch is provided which may be operated to transfer the data from the character memory 21 to the pattern memory 11 or vice versa.

While the invention has been described with reference to a monochromatic cathode-ray tube display device, it should be noted that the technical concept of the invention can be equally applied to a color cathode-ray tube display device. That is, the color cathode-ray tube display can be realized by increasing the capacity of the memory three fold in correspondence with the three primary colors and carrying out the above-described operation for each of the three primary colors.

As is apparent from the above description, according to the present invention, a cathode-ray tube display device having a pair of cathode-ray tubes in which a light pen is used to write, erase and edit information or image data displayed on display screens of the two cathode-ray tubes is provided. More specifically, the entire complement of data which is displayed on the first cathode-ray tube having relatively large dimensions is divided into a plurality of blocks each having a predetermined number of picture elements. Then the data for a single selected block is transferred to the second cathode-ray tube having relatively small dimensions and is there displayed at an enlarged scale. On the screen of the second cathode-ray tube, the data may be modified as desired with the use of the light pen. Subsequently, the modified data is transferred back to the first cathode-ray tube.

Furthermore, the invention has been described with reference to a cathode-ray tube display device in which a light pen is used to write, erase and transfer data for the first and second cathode-ray tubes. However, it should be noted that the invention is not limited thereto or thereby. For instance, the technical concept of the invention can be realized by a display device having two display screens, in which, unlike the data dividing method employed in the above described embodiment, the data displayed on the first cathode-ray tube is divided into blocks each covering a single character. The data of the block is enlarged and displayed on the second cathode-ray tube thereby allowing the operator to observe with ease an optional part of the data on the first cathode-ray tube.

In this case, the display device may be constructed as described below. It is not always necessary to employ a central processing unit. Such a modified display device includes a first cathode-ray tube, a first memory having addresses which correspond respectively to the addresses of picture elements on the screen of the first cathode-ray tube in which is stored data for display over the entire screen of the first cathode-ray tube with data from the first memory being read in synchronization with the raster scanning of the first cathode-ray tube so as to display the entire complement of data stored in the first memory on the entire screen of the first cathode-ray tube. A second cathode-ray tube is provided the raster scanning of which is effected in synchronization with the raster scanning of the first cathode-ray tube. A second memory has addresses which correspond to the addresses of picture elements in a single block and which are obtained by dividing all of the picture elements on the screen of the first cathode-ray tube into a plurality of blocks each including a predetermined number of picture elements. The second memory is read in synchronization with the raster scanning of the first cathode-ray tube so that the entire data for one block stored in the second memory is displayed on the entire screen of the second cathode-ray tube. A first position discriminating section is provided including a light pen the tip of which can be applied to the screen of either the first or second cathode-ray tube to detect the raster light and in response thereto to output position data representative of the position of the tip of the light pen on the screen of the first or second cathode-ray tube with the aid of a detection output provided by the light pen. The first position discriminating section operates to produce first position data when the tip of the light pen is applied to the screen of the first cathode-ray tube and operates to produce second position data when applied to the screen of the second cathode-ray tube. A second position discriminating section discriminates among the plurality of blocks provided by dividing all of the picture elements of the screen of the first cathode-ray tube, one block to which the position data outputted by the first position discriminating means belongs, to output block position data. A transferring section includes a first transferring section and a second transferring, the first transferring section transfers the entire picture element data for a block designated by the block position data outputted by the second position discriminating device which is stored in corresponding storing addresses in the first memory to the second memory where it is stored in corresponding storing addresses therein. The second transferring section transfers the entire set of picture element data for a single block designated by the block position data produced by the second position discriminating section, which is stored in the corresponding addresses in the second memory, to the first memory where it is stored in the corresponding addresses therein. A first writing section is provided for writing the data for each picture element designated by the first position data produced by the first position discriminating section at the corresponding storing address of the first memory or erasing the data stored in the corresponding address thereof. A writing section writes the data for each picture element designated by the second position data produced by the first position discriminating section at the corresponding address of the second memory or erases the data stored in the corresponding address thereof. Input key switches supply an operation instruction signals to control operations of each of the above-described elements.

What is claimed is:

1. A cathode-ray tube display device in which scanning lines are divided into a number of picture elements, the brightness of each picture element is controlled, and an image of characters, figures or the like is displayed on the screen thereof in a plurality of picture element matrices extending vertically and horizontally comprising:
   a first cathode-ray tube;
   means for raster scanning said first cathode-ray tube;
   first memory means including a first memory having addresses corresponding to addresses of picture elements on the screen of said first cathode-ray tube, said first memory storing data to be displayed on the screen of said first cathode-ray tube, said first memory means reading said first memory in synchronization with raster scanning of said first cathode-ray tube to display the data stored in said first memory on the screen of said first cathode-ray tube;
   a second cathode-ray tube;
   means for scanning said second cathode-ray tube in synchronization with the raster scanning of said first cathode-ray tube;
   second memory means including a second memory having addresses corresponding to addresses of picture elements in a block obtained by dividing picture elements on the screen of said first cathode-ray tube into a plurality of blocks each including a predetermined number of picture elements, said second memory means reading said second memory in synchronization with the raster scanning of said first cathode-ray tube wherein the data for a block stored in said second memory is displayed on the screen of said second cathode-ray tube;
   first position discriminating means including a light pen having a tip adapted to be applied to the screen of said first and second cathode-ray tubes to detect raster light and for outputting position data representative of the position of said tip of said light pen on the screen of one of said first and second cathode-ray tubes;
   second position discriminating means for discriminating among said plurality of blocks by dividing all of the picture elements on the screen of said first cathode-ray tube in one block to which said position data outputted by said first position discriminating means belongs to output block position data; and
   transferring means for transferring the picture element data for one block between said first and second memory means.

2. The cathode-ray tube display device as defined in claim 1 wherein said transferring means comprises a first transferring means, said first transferring means transferring the picture element data for one block designated by said block position data outputted by said second position discriminating means and which is stored at corresponding addresses in said first memory of said first memory means to said second memory of said second memory means to be stored in corresponding addresses therein.

3. The cathode-ray tube display device as defined in claim 1 wherein said first position discriminating means operates to output first position data when said tip of said light pen is applied to the screen of said first cathode-ray tube and wherein said first position discriminating means operates to output second position data when said tip of said light pen is applied to the screen of said second cathode-ray tube.

4. The cathode-ray tube display device as defined in claim 3 wherein said transferring means comprises a second transferring means, said second transferring means transferring the picture element data for one block designated by said block position data produced by said second position discriminating means and which is stored at corresponding addresses in said second memory of said second memory means to said first memory of said first memory means to be stored in corresponding addresses therein.

5. The cathode-ray tube display device as defined in claim 4 further comprising second means for writing data for each picture element designated by said second position data produced by said first position discriminating means at a corresponding address of said second memory in said second memory means and erasing data stored at a corresponding address thereof.

6. The cathode-ray tube display device as defined in claim 5 further comprising:
   first means for writing data for each picture element designated by said first position data produced by said first position discriminating means at a corresponding storing address of said first memory in said first memory means and erasing data stored at the corresponding storing address thereof; and
   first key switch input means for supplying an instruction for performing one of (a) energizing said first writing means and suspending an operation of said second position discriminating means and (b) suspending an operation of said first writing means and energizing said second position discriminating means.

7. The cathode-ray tube display device as defined in claim 3 wherein said transferring means comprises a first transferring means and a second transferring means, said first transferring means transferring picture element data for one block designated by said block position data outputted by said second position discriminating means which is stored at corresponding addresses in said first memory of said first memory means to said second memory of said second memory means to be stored at corresponding addresses therein and said second transferring means transferring picture element data for one block designated by said block position data produced by said second position discriminating means, which is stored at corresponding addresses in said second memory of said second memory means, to said first memory of said first memory means to be stored in corresponding addresses therein.

8. The cathode-ray tube display device as defined in claim 7 further comprises:
   first means for writing the data for each picture element designated by said first position data produced by said first position discriminating means at a corresponding address in said first memory of said first memory means and erasing data stored at a corresponding address thereof; and
   second key switch input means for controlling operations of said transferring means and said first and second position discriminating means.

9. The cathode-ray tube display device as defined in claim 8 further comprising second means for writing data for each picture element designated by said second position data produced by said first position discriminating means at a corresponding address of said second memory in said second memory means and erasing data stored at a corresponding address thereof and wherein said second key switch input means selectively supplies an instruction to suspend an operation of said second discriminating means when said first discriminating means produced the first position data to (a) energize said second discriminating means and said first transferring means and to suspend an operation of said second transferring means and to (b) energize said second discriminating means and said second transferring means and to suspend an operation of said first transferring means.

10. The cathode-ray tube display device as defined in claim 8 wherein said second key switch input means alternatively supplies an instruction (a) to energize said first transferring means and to suspend an operation of said second transferring means and (b) to energize said second transferring means and to suspend an operation of said first transferring means.

11. A cathode-ray tube display device comprising:
a central processing unit having an address bus, a data bus, a write instruction output signal and a read instruction output signal;
first through eighth bus buffers, said first and second bus buffers being adapted to receive and transmit data to and from said data bus and said third through eighth bus buffers being adapted to transmit data to said data bus;
a first address decoder having inputs coupled to said address bus and to said write data instruction signal and to said read data instruction signal, said address decoder producing output signals coupled to said first and second bus buffers;
a second address decoder having inputs coupled to said address bus and said read data instruction signal, said second address encoder having outputs coupled to each of said third through eighth bus buffers;
a clock oscillator;
a synchronization signal generator operating in response to said oscillator for producing vertical synchronization, horizontal synchronization and blanking signals;
a first counter operating in response to said oscillator for producing a first clock pulse signal having a clock pulse interval corresponding to the time between display of dots on a first cathode-ray tube and a second clock pulse signal having a pulse interval corresponding to the time between display of dots on a second cathode-ray tube;
a first cathode-ray tube display;
a pattern memory, said pattern memory storing data including a plurality of characters in dot matrix form for display upon said first cathode-ray tube display;
a pattern address counter operating in response to said vertical synchronization signal, said horizontal synchronization signal, said blanking signal and said first clock pulse signal for producing addressing signal coupled to said pattern memory for reading data out of said pattern memory for display upon said first cathode-ray tube display;
a first selector receiving inputs from said pattern address counter and said address bus and having outputs coupled to address inputs of said pattern memory, said selector operating in response to said blanking signal;
a second cathode-ray tube display;
a character memory for storing a character pattern selected from those displayed upon said first cathode-ray tube display for display upon said second cathode-ray tube display at an enlarged size compared with its size as displayed upon said first cathode-ray tube display;
a character address counter operating in response to said vertical synchronizing signal, said horizontal synchronizing signal, said blanking signal and said second clock pulse for producing addressing signals for said character memory for reading data out of said character memory for display upon said second cathode-ray tube display;
a second selector receiving inputs from said address bus and said character address counter and having outputs coupled to address inputs of said character memory, said second selector operating in response to said blanking signal;
said first and second bus buffers being coupled to data ports of said pattern memory and said character memory, respectively; and
means for designating a character upon the screen of said first cathode-ray tube display.

12. The cathode-ray tube display device of claim 11 wherein said designating means comprises a light pen device for designating a character on said first cathode-ray tube display and for performing editing operations upon a character displayed upon said second cathode-ray tube display.

13. The cathode-ray tube display device of claim 12 wherein said light pen device comprises:
a light pen having a tip adapted to be applied to the screen of said first and second cathode-ray tube displays, said light pen producing an output detection signal in response to the presence of input light;
first and second latch circuits receiving, respectively, output data from said pattern address counter and said character address counter and operating in response to said output detection signal from said light pen to store data from said pattern address counter and said character address counter in response to the presence of said detection output signal;
first and second decoders coupled to receive outputs from said first and second latches, respectively; and
said fourth bus buffer being coupled to receive outputs from said second decoder, said sixth bus buffer being coupled to receive outputs from said second decoder, said fifth bus buffer being coupled to receive outputs from said second latch and said seventh bus buffer being coupled to receive outputs from said first latch.

14. The cathode-ray tube display device of any of claims 11-13 further comprising:
a key switch panel;
an encoder coupled to receive outputs from said key switch panel; and
said eighth bus buffer being coupled to receive outputs from said encoder.

* * * * *